United States Patent
Ikegaya (10) Patent No.: US 11,904,989 B2
(45) Date of Patent: Feb. 20, 2024

(54) CONTROL DEVICE FOR BATTERY OF MARINE VESSEL, CONTROL METHOD THEREFOR, AND MARINE VESSEL

(71) Applicant: YAMAHA HATSUDOKI KABUSHIKI KAISHA, Iwata (JP)

(72) Inventor: Yuji Ikegaya, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 513 days.

(21) Appl. No.: 17/203,842

(22) Filed: Mar. 17, 2021

(65) Prior Publication Data
US 2021/0309325 A1   Oct. 7, 2021

(30) Foreign Application Priority Data
Apr. 2, 2020   (JP) ................................ 2020-066663

(51) Int. Cl.
*B63B 79/40*   (2020.01)
*B60L 50/60*   (2019.01)
(Continued)

(52) U.S. Cl.
CPC .............. *B63B 79/40* (2020.01); *B60L 50/60* (2019.02); *B63B 79/10* (2020.01); *B63H 1/14* (2013.01);
(Continued)

(58) Field of Classification Search
CPC ......... B63B 79/40; B63B 79/10; B60L 50/60; B60L 50/16; B60L 2200/32; B60L 50/61;
(Continued)

(56) References Cited

U.S. PATENT DOCUMENTS 5,111,132 A * 5/1992 Motose ................. H02J 7/1423
322/90
7,556,547 B2 * 7/2009 Kaji ....................... B63H 21/20
440/87
(Continued)

FOREIGN PATENT DOCUMENTS

EP    2 528 189 A1    11/2012
EP    2007001 B1 *   10/2016  ............ H02J 7/1492
(Continued)

OTHER PUBLICATIONS

T. M. N. Bui, T. Q. Dinh, J. Marco and C. Watts, "An Energy Management Strategy for DC Hybrid Electric Propulsion System of Marine Vessels," 2018 5th International Conference on Control, Decision and Information Technologies (CoDIT), Thessaloniki, Greece, 2018, pp. 80-85 (Year: 2018).*
(Continued)

*Primary Examiner* — M Baye Diao
(74) *Attorney, Agent, or Firm* — Keating & Bennett, LLP (57) ABSTRACT

In a control device for a battery of a marine vessel, a first value indicating either a voltage or a power storage amount of a main battery to supply electric power to start the engine is acquired. When the first value that has been acquired is smaller than a first threshold value, at least one of a prohibition of a transition to a motor drive mode in which a propeller is driven by using at least a motor regardless of an operation mode that is designated and a prohibition of charging a load battery is performed, and the engine is caused to rotate to charge the main battery.

17 Claims, 5 Drawing Sheets

(51) Int. Cl.
  *B63B 79/10* (2020.01)
  *B63H 1/14* (2006.01)
  *B63H 20/00* (2006.01)
  *B63H 21/20* (2006.01)
  *F02N 11/08* (2006.01)

(52) U.S. Cl.
  CPC ............ *B63H 20/00* (2013.01); *B63H 21/20* (2013.01); *F02N 11/0862* (2013.01); *B63H 2021/205* (2013.01)

(58) Field of Classification Search
  CPC .......... B63H 1/14; B63H 20/00; B63H 21/20; B63H 2021/205; B63H 20/007; F02N 11/0862; Y02T 10/62; Y02T 10/70; Y02T 10/7072; Y02T 70/5236; H02J 7/0024; H02J 7/00306; H02J 7/0048; H02J 7/0063; H02J 7/1423; H02J 7/1438; H02J 7/34; H02J 2310/42; H02J 2310/48
  USPC .......................................................... 320/134
  See application file for complete search history.

(56) References Cited

U.S. PATENT DOCUMENTS

| | | | | |
|---|---|---|---|---|
| 8,164,306 | B2* | 4/2012 | Mizushima | B63H 23/24 |
| | | | | 320/128 |
| 8,170,735 | B2* | 5/2012 | Kaji | B63H 21/21 |
| | | | | 114/144 R |
| 8,814,614 | B2* | 8/2014 | Suzuki | B63H 1/16 |
| | | | | 440/71 |
| 8,992,274 | B1* | 3/2015 | Ward | B63H 21/20 |
| | | | | 440/87 |
| 9,014,909 | B1* | 4/2015 | Dengel | B63H 20/00 |
| | | | | 440/87 |
| 9,227,712 | B2* | 1/2016 | Davis | B63H 20/06 |
| 9,614,397 | B2* | 4/2017 | Sonoda | H02J 7/1492 |
| 9,937,988 | B2* | 4/2018 | Fukuda | B63H 20/00 |
| 9,975,619 | B1* | 5/2018 | Gonring | H02P 9/48 |
| 10,640,190 | B1* | 5/2020 | Gonring | B63H 25/02 |
| 11,364,874 | B2* | 6/2022 | Takano | G07C 9/00182 |
| 11,447,223 | B2* | 9/2022 | Ikegaya | H02J 7/0031 |
| 11,731,744 | B2* | 8/2023 | Ikegaya | G07C 5/0808 |
| | | | | 701/21 |
| 2010/0033130 | A1* | 2/2010 | Mizushima | B63H 23/24 |
| | | | | 320/126 |
| 2015/0155720 | A1 | 6/2015 | Mise et al. | |
| 2021/0300516 | A1* | 9/2021 | Hayashi | B63H 21/22 |

FOREIGN PATENT DOCUMENTS

| | | | | |
|---|---|---|---|---|
| EP | 3 130 532 | A1 | 2/2017 | |
| EP | 3890152 | A1 * | 10/2021 | ............ B63H 21/17 |
| JP | 2004-255972 | A | 9/2004 | |
| JP | 2005-287146 | A | 10/2005 | |
| JP | 2010-063350 | A | 3/2010 | |
| JP | 2015-106962 | A | 6/2015 | |

OTHER PUBLICATIONS

V. Tummakuri, T. R. Chelliah and U. S. Ramesh, "Sizing of Energy Storage System for a Battery Operated Short Endurance Marine Vessel," 2020 IEEE International Conference on Power Electronics, Smart Grid and Renewable Energy (PESGRE2020), Cochin, India, 2020, pp. 1-6 (Year: 2020).*

Official Communication issued in corresponding European Patent Application No. 21164600.5, dated Sep. 2, 2021.

* cited by examiner

CONTROL DEVICE FOR BATTERY OF MARINE VESSEL, CONTROL METHOD THEREFOR, AND MARINE VESSEL

CROSS REFERENCE TO RELATED APPLICATIONS

This application claims the benefit of priority to Japanese Patent Application No. 2020-066663 filed on Apr. 2, 2020. The entire contents of this application are hereby incorporated herein by reference.

BACKGROUND OF THE INVENTION

1. Field of the Invention

The present invention relates to a control device for a battery of a marine vessel, a control method therefor, and a marine vessel.

2. Description of the Related Art

As disclosed in Japanese Laid-open Patent Publication (Kokai) No. 2015-106962 and Japanese Laid-open Patent Publication (Kokai) No. 2005-287146, so-called hybrid vehicles are known in the field of automobiles. In the technology of Japanese Laid-open Patent Publication (Kokai) No. 2015-106962, battery information of a plurality of power storage devices is provided to an ECU, and a charger/discharger is controlled to charge the plurality of power storage devices one by one with a priority order. In the technology of Japanese Laid-open Patent Publication (Kokai) No. 2005-287146, a control circuit acquires State of Charge (SOC) information of first and second batteries connected with an alternator, and controls a relay to charge the battery with less SOC with priority.

Also in the field of marine vessels, a marine vessel, in which any of an engine and a motor is capable of driving a propeller of a marine propulsion device, is known. On this type of marine vessel, in addition to a main battery for starting the engine, a plurality of batteries, such as a battery for driving the motor and a battery for a load on the marine vessel, are mounted.

A method for effectively controlling the plurality of batteries mounted on such a marine vessel, however, is at an investigation stage, and there is room for improvement. A hybrid system in the marine vessel has various operation modes. For example, there is a mode in which a propeller is driven only by a motor whereas an engine is stopped. When a situation in which the engine is not rotated by an instruction of the operation mode continues for a long time, a voltage or power storage amount of the battery for starting the engine may be reduced.

Ensuring an appropriate voltage or power storage amount of the main battery is needed to start the engine. In particular, the marine vessel may not be able to return to a port when the engine cannot be started on the ocean. Therefore, an importance of avoiding an excessive reduction in the voltage or power storage amount of the main battery is higher than that of vehicles on the land.

SUMMARY OF THE INVENTION

Preferred embodiments of the present each provide electric power to start an engine with priority.

According to a preferred embodiment of the present invention, a control device for a battery of a marine vessel is configured or programmed to control a plurality of batteries mounted on the marine vessel. A propeller of a marine propulsion device of the marine vessel is driven by any of an engine and a motor. The plurality of batteries include a main battery to supply electric power to start the engine, a drive battery to supply the electric power to drive the motor, and a load battery to supply the electric power to a load on the marine vessel, wherein the plurality of batteries are chargeable by a generator. The control device includes a controller configured or programmed to acquire a first value indicating either a voltage or a power storage amount of the main battery, and when the first value that has been acquired is smaller than a first threshold value, perform at least one of a prohibition of a transition to a motor drive mode in which the propeller is driven by using at least the motor regardless of an operation mode that is designated and a prohibition of charging the load battery, and cause the engine to rotate to charge the main battery.

According to such a configuration, the first value indicating the voltage or the power storage amount of the main battery is acquired. When the first value is smaller than the first threshold value, control is conducted to perform at least one of the prohibition of the transition to the motor drive mode in which the propeller is driven by using at least the motor regardless of the operation mode that is designated and the prohibition of charging the load battery, and to cause the engine to rotate to charge the main battery.

That is, according to such a configuration, by prohibiting the transition to the motor drive mode, consumption of the electric power caused by driving the motor is avoided. Since charging of the load battery is prohibited, the priorities in charging the main battery and the drive battery are made higher than that of the load battery. By causing the engine to rotate, the main battery becomes chargeable.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings.

Figure 1:
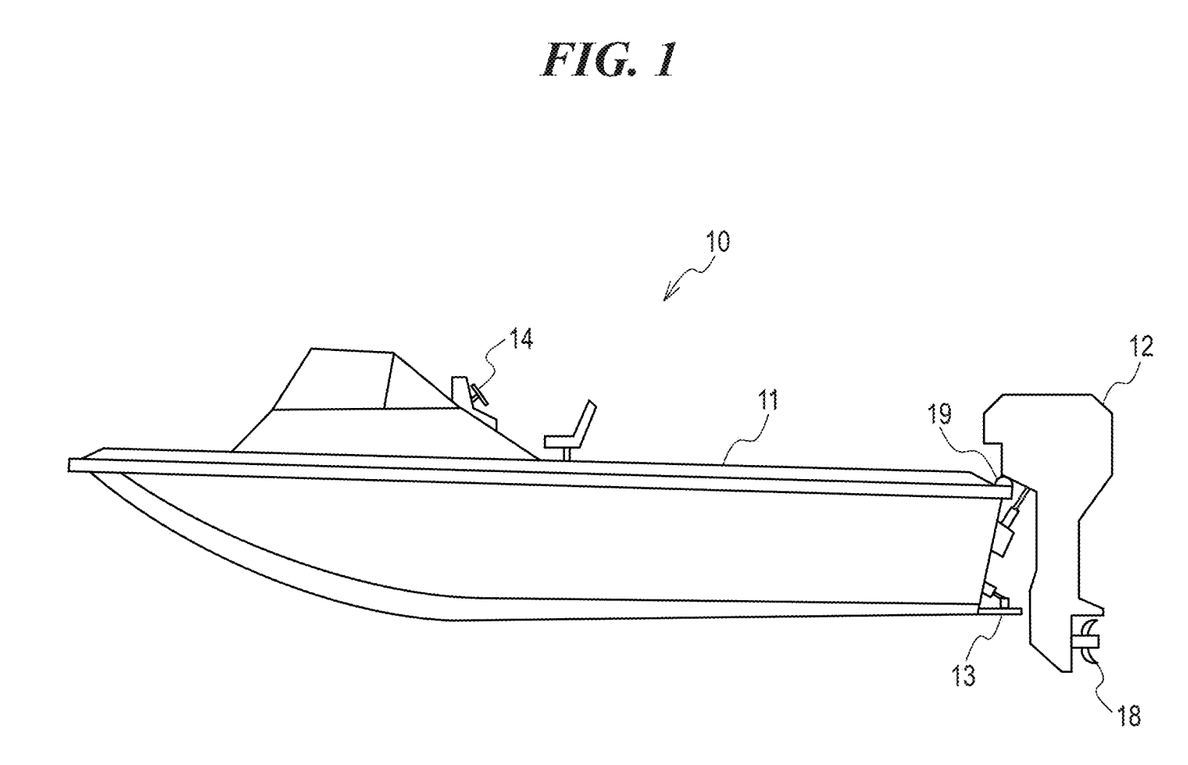
FIG. 1 is a side view of a marine vessel to which a controller of a battery is applied.

FIG. 1 is a side view of a marine vessel to which a controller of a battery is applied according to a preferred embodiment of the present invention. A marine vessel 10 is a planing boat, and includes a hull 11, a plurality of outboard motors 12 as marine propulsion devices mounted on the hull 11, and a plurality of trim tabs 13. A steering wheel 14 and an operation lever 32 (FIG. 2) to be described below are provided in the vicinity of a vessel steering seat of the hull 11.

The outboard motors 12 are attached to a stern of the hull 11 side by side. Each outboard motor 12 is attached to the hull 11 via a mounting unit 19, and rotates around a vertical or substantially vertical steering shaft in the mounting unit 19 in accordance with an operation on the steering wheel 14. Accordingly, the marine vessel 10 is steered. Each trim tab 13 is attached to the stern of the hull 11 and swings around a horizontal or substantially horizontal swing shaft at the stern. Accordingly, a lift generated at the stern of the hull 11 is adjusted to control the posture of the hull 11.

Each outboard motor 12 includes two drive sources. One drive source is an engine 23, which may be an internal combustion engine, and the other drive source is an electric motor 25 (hereinafter, simply referred to as a "motor 25"). Each outboard motor 12 obtains a propulsion force through a propeller 18 (propulsion blades) rotated by a driving force of the corresponding engine 23 or electric motor 25. That is, each outboard motor 12 is able to drive the propeller 18 with any of the engine 23 and the motor 25.

Figure 2:
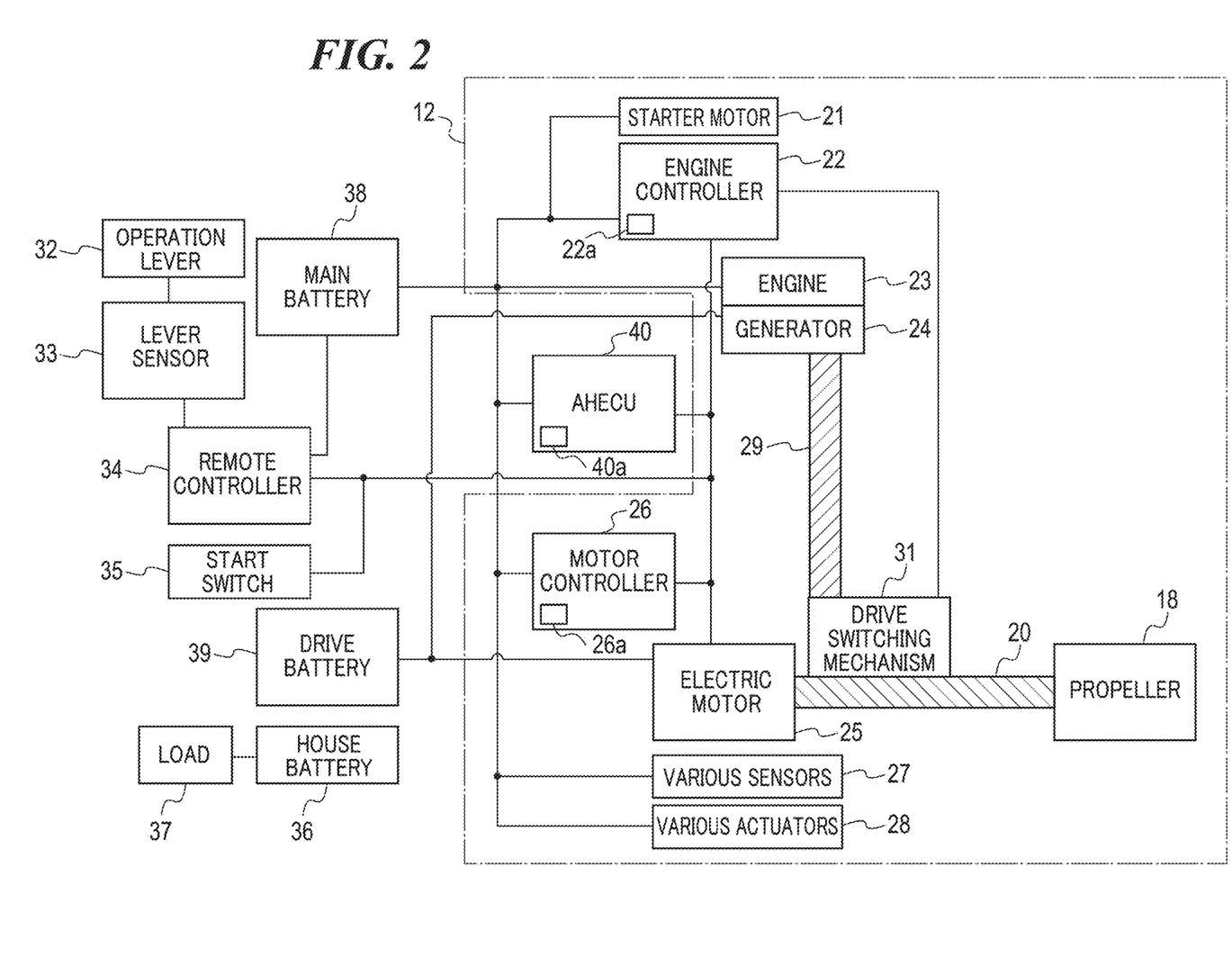
FIG. 2 is a block diagram showing an outboard motor and the related configuration.

FIG. 2 is a block diagram showing an outboard motor 12 and the related configuration. In FIG. 2, each block is connected by a CAN (Control Area Network), an analog signal line, or a power supply line. In particular, the controllers are connected with each other to enable CAN communication.

The outboard motor 12 includes a starter motor 21, an engine controller 22, an engine 23, a generator 24, a motor 25, a motor controller 26, various sensors 27, various actuators 28, and a drive switching mechanism 31. The drive switching mechanism 31 is coupled with the engine 23 through an engine drive shaft 29. The drive switching mechanism 31 is coupled with a propeller shaft 20 (propulsion shaft). A shaft of the motor 25 is coupled with the drive switching mechanism 31 and the propeller shaft 20. The propeller 18 is attached to the propeller shaft 20. The drive switching mechanism 31 includes a clutch mechanism, a shift mechanism, and the like, and switches a transmission source of the driving force to the propeller shaft 20 between the engine 23 and the motor 25.

The starter motor 21 starts the engine 23. The engine controller 22 controls the engine 23. The engine controller 22 changes an output of the engine 23 by controlling a throttle actuator and a fuel supply device. The generator 24 generates electric power using rotations of the engine 23. The motor controller 26 controls the motor 25. The various sensors 27 include a sensor to detect the number of rotations of the engine 23, a sensor to detect a throttle opening angle, and the like. An AHECU (Actuator Head ECU) 40 (a controller) acquires detection results of the various sensors 27 from each controller through the CAN. The various actuators 28 include a throttle actuator that changes an opening angle of a throttle valve, and the like. The AHECU 40 causes the corresponding controllers to control the various actuators 28 through the CAN.

The hull 11 includes the AHECU 40, the operation lever 32, a lever sensor 33, a remote controller 34, a start switch a house battery 36 (load battery), a load 37, a main battery 38, and a drive battery 39. It is to be noted that the AHECU 40 may be provided in each outboard motor 12, or may be provided in any of the plurality of outboard motors 12.

The main battery 38 supplies the electric power to the AHECU 40, the remote controller 34, the starter motor 21, the engine controller 22, the engine 23, the motor controller 26, the various sensors 27, the various actuators 28, and the like. The drive battery 39 supplies the electric power to the motor 25. The house battery 36 supplies the electric power to the load 37, such as a television, on the marine vessel. A combination of a power supply source and a power supply destination is not limited to the above examples.

The AHECU 40 includes a first holding unit 40a including a rewritable nonvolatile memory such as an EEPROM. The engine controller 22 and the motor controller 26 respectively include an engine memory 22a and a motor memory 26a as a second holding unit that is a rewritable nonvolatile memory.

The operation lever 32 is included in a remote controller unit (not shown), the lever sensor 33 detects an operation position of the operation lever 32, and sends a detection result to the remote controller 34. The remote controller 34 generates a request value of the throttle opening angle and a request torque based on the detection result acquired from the lever sensor 33, and outputs the request value and the request torque to the AHECU 40. The AHECU 40 sends the value received from the remote controller 34 to the engine controller 22 and the motor controller 26, as an output request. At that time, the AHECU 40 distributes the received value according to an operation situation or the like, and sends the distributed values to the engine controller 22 and the motor controller 26. The engine controller 22 drives the engine 23 in accordance with the received output request. The motor controller 26 drives the motor 25 in accordance with the received output request. When the AHECU 40 outputs an engine start instruction to the engine controller 22, the engine controller 22 causes the starter motor 21 to start the engine 23. In this case, the engine controller 22 drives a relay, and accordingly, the starter motor 21 obtains the electric power from the main battery 38, and starts the engine 23.

The start switch 35 may be positioned at an operation position of any of an OFF position, an ON position, and a START position by an operation of a vessel operator. When the vessel operator positions the start switch 35 at the START position and then releases a hand from the start switch 35, the start switch 35 automatically returns to the ON position. The START position is an operation position to activate the starter motor 21 and cause the AHECU 40 to store the fact that the activation of the starter motor 21 has been permitted. When a start permission instruction to permit the start of the engine 23 is input into the AHECU 40, the fact that the start of the engine 23 has been permitted is stored in the AHECU 40. Such storage is held until the start switch 35 is positioned at the OFF position.

It is to be noted that the configuration of the start switch 35 is not limited to this. For example, a main switch and a start/stop switch may be provided, and while the main switch is on, the start/stop switch may be operated to activate or stop activating the starter motor 21.

The second holding unit (the engine memory 22a and the motor memory 26a) stores second information (mode information and each instruction value). The mode information includes information indicating an operation mode to be described below. Each instruction value is a value to control the engine 23 or the motor 25. The engine memory 22a stores, as an instruction value to control the engine 23, at least one of an instruction value of a target number of rotations of the engine 23, an instruction value of a target torque of the engine 23, an instruction value of a shift position, an instruction value of the throttle opening angle, and a value indicating a failure state. The motor memory 26a stores, as an instruction value to control the motor 25, at least one of an instruction value of a target number of rotations of the motor 25, an instruction value of a target torque of the motor 25, a value indicating a drive state of the motor 25, and a value indicating a failure state.

The AHECU 40 integrally controls the main battery 38, the drive battery 39, and the house battery 36. It is to be noted that the function of the AHECU 40 may be provided in the engine controller 22 or the remote controller 34, and these controllers may be integrally controlled. Alternatively, instead of the AHECU 40, a battery controller to integrally control the respective batteries may be provided.

The operation mode of the outboard motor 12 will be described. The operation mode of the outboard motor 12 includes a stop mode, a motor drive mode (a first motor drive mode and a second motor drive mode), an engine mode, a first synchronization mode, and a second synchronization mode. The stop mode is a mode in which both the engine 23 and the motor 25 are stopped. The first motor drive mode is a mode in which the engine 23 is stopped and the propeller 18 is driven exclusively by the motor 25 with the electric power from the drive battery 39. The second motor drive mode is a mode in which the propeller 18 is driven exclusively by the motor 25 with the electric power from the drive battery 39, while the drive battery 39 is being charged by the electric power generated by the generator 24 due to operation of the engine 23. The engine mode is a mode in which the motor 25 is stopped and the propeller 18 is driven exclusively by the engine 23.

The first synchronization mode is a mode that the operation mode of the outboard motor 12 passes through when transitioning mutually between the stop mode, the first motor drive mode, the second motor drive mode, and the engine mode. The second synchronization mode is a mode that the operation mode of the outboard motor 12 passes through when transitioning mutually between the stop mode, the second motor drive mode, and the engine mode. The first synchronization mode and the second synchronization mode are provided to smooth the transition of the operation mode of the outboard motor 12, and are controlled according to the shift position, the number of rotations of the engine, the number of rotations of the motor, and the like. In the present preferred embodiment, there is no mode to drive the propeller 18 by using dynamic power of the engine 23 and dynamic power of the motor 25 in combination.

Figure 3:
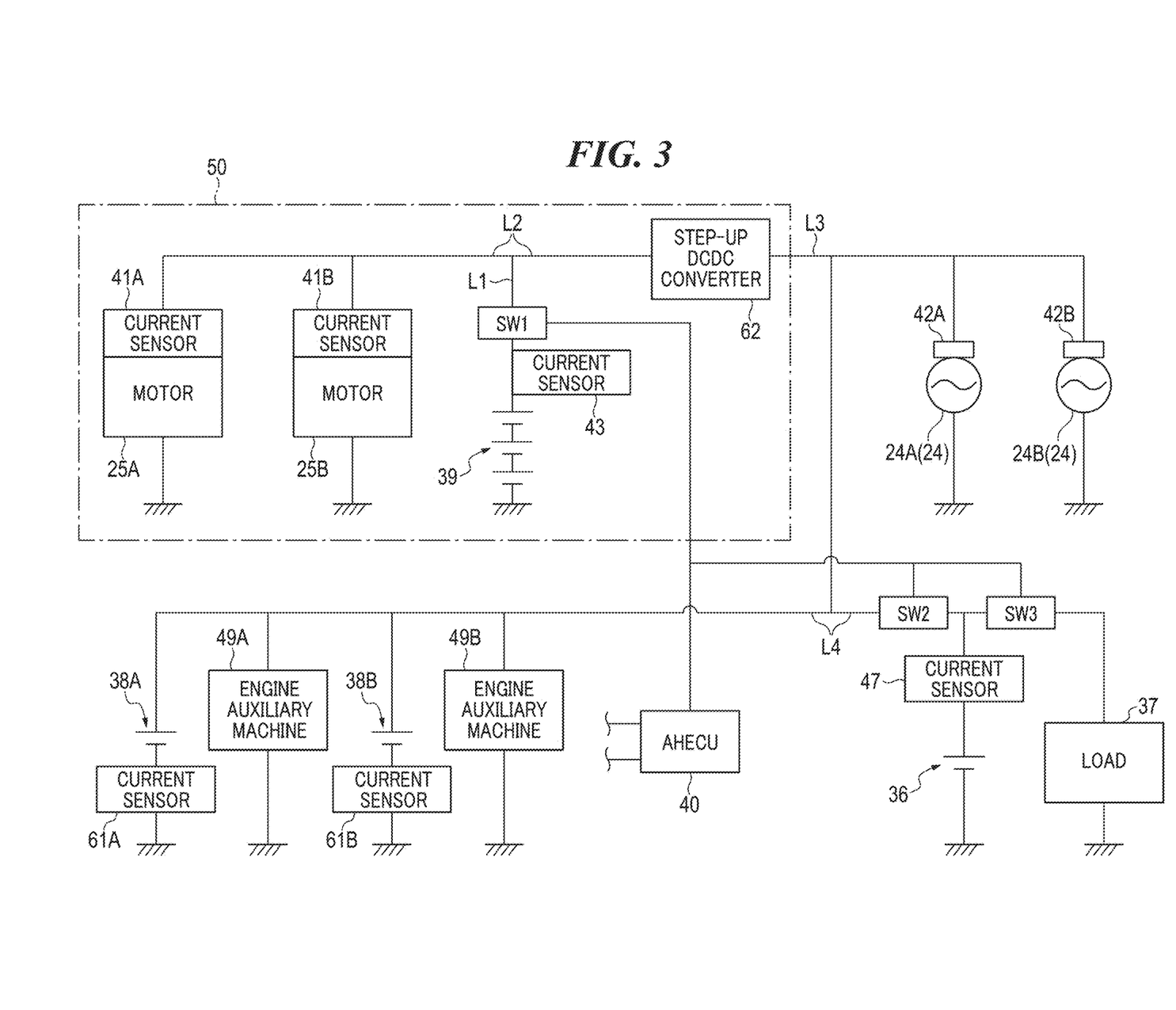
FIG. 3 is a block diagram showing the flow of electric power supply.

FIG. 3 is a block diagram showing the flow of the electric power supply. In the description of FIG. 3, a case in which the number of the outboard motors 12 is two is taken as an example. Accordingly, regarding the motor 25, the generator 24, and the main battery 38, motors 25A and 25B, generators 24A and 24B, and main batteries 38A and 38B are provided to respectively correspond to the two outboard motors 12. In addition, the engines 23 of the respective outboard motors 12 are provided with engine auxiliary machines 49A and 49B.

Both the main batteries 38A and 38B are lead batteries to supply the electric power to start the corresponding engines 23. The house battery 36 may be a lead battery. One drive battery 39 is provided in common for all (two in this example) the outboard motors 12. The drive battery 39 is preferably a lead battery to supply the electric power to drive the motors 25A and 25B. As an example, the rated voltages of the main batteries 38A and 38B and the house battery 36 are all 12 V, and the rated voltage of the drive battery 39 is 36 V. It is to be noted that the above rated voltages are not limited to those examples. All the drive battery 39, the main batteries 38A and 38B, and the house battery 36 may be respectively charged by the generators 24A and 24B.

Power lines (lines L1 to L4 and the like) are shown in FIG. 3, and a portion of a signal line used by the AHECU 40 for the control is shown in FIG. 3. A high voltage unit 50 includes the drive battery 39, the motors 25A and 25B, a step-up DCDC converter 62, current sensors 41A, 41B, and 43, and a switch SW1. The various sensors 27 (FIG. 2) include current sensors 41A, 41B, 42A, 42B, 43, 47, 61A, and 61B. The various actuators 28 (FIG. 2) include the engine auxiliary machines 49A and 49B. The current sensor 47 is located between the house battery 36 and the line L4.

The drive battery 39 is connected with the line L2 through the line L1. The electric power generated by the generator 24 is boosted by the step-up DCDC converter 62 via the line L3, and is output to the line L2. The electric power generated by the generator 24 is supplied to charge the drive battery 39 through the line L2. The electric power generated by the generator 24 or the electric power of the drive battery 39 is supplied to the motors 25A and 25B through the line L2. The electric power generated by the generator 24 is supplied to charge the main batteries 38A and 38B and the house battery 36 through the lines L3 and L4.

The AHECU 40 controls connection (ON)/disconnection (OFF) of the switches SW1, SW2, and SW3. The generators 24 and the drive battery 39 are connected via lines L1, L2, and L3. The switch SW1 is provided on the line L1. Accordingly, when the switch SW1 is in a connection state (ON state), electric current flows between the drive battery 39 and the line L2. The switches SW2 and SW3 are provided on the line L4. Accordingly, when the switch SW2 is in the ON state, the electric current flows from the generators 24 to the house battery 36. Further, when the switch SW3 is in the ON state, the electric current flows from the generator 24 or the house battery 36 to the load 37.

The current sensors 41A and 41B are respectively provided on the motors 25A and 25B. The current sensors 41A and 41B respectively detect the electric current flowing between the line L2 and the motors 25A and 25B. The AHECU 40 acquires electric power amounts respectively supplied from the line L2 to the motors 25A and 25B based on detection results of the current sensors 41A and 41B.

The current sensors 42A and 42B are respectively provided on the generators 24A and 24B. The current sensors 42A and 42B respectively detect the electric current flowing from the generators 24A and 24B to the line L3. The AHECU 40 monitors detection results of the current sensors 42A and 42B, and thus acquires power generation voltages generated by the generators 24A and 24B and electric power amounts (power generation amounts) respectively flowing into the line L3 from the generators 24A and 24B. It is to be noted that the AHECU 40 may estimate and acquire the electric power amount flowing into the line L3 from the number of rotations of the corresponding engine 23. A smoothed value obtained by filtering a signal to eliminate a peak value is adopted for the electric power amount and the electric current amount used in the present preferred embodiment.

The current sensors 61A and 61B are respectively provided on the main batteries 38A and 38B. The current sensors 61A and 61B respectively detect the electric current flowing between the main batteries 38A and 38B and the line L2. The AHECU 40 monitors detection results of the current sensors 61A and 61B, and thus respectively acquires voltages mainVA and mainVB of the main batteries 38A and 38B and power storage amounts mainSOCs of the main batteries 38A and 38B. Here, a smaller one of the voltages mainVA and mainVB is set to a voltage mainV (a first value). In addition, a smaller one of the power storage amounts mainSOCs of the main batteries 38A and 38B is used for control to be described below.

The current sensor 43 is located between the drive battery 39 and the line L2. The current sensor 43 detects the electric current flowing between the drive battery 39 and the line L2. The AHECU 40 monitors a detection result of the current sensor 43, and thus acquires a voltage motV (a second value) of the drive battery 39 and a power storage amount motSOC, which is a residual capacity of the drive battery 39.

As described above, the plurality of batteries (the drive battery 39, the main battery 38, and the house battery 36) are mounted on the hull 11, and these batteries are charged by the power generation of the generator 24. When the engine cannot be started on the ocean, the marine vessel may not be able to return to a port. Therefore, among the plurality of batteries, it is important to avoid an excessive reduction in the voltage mainV and the power storage amount mainSOC of the main battery 38 to start the engine. Thus, as will be described below, the AHECU 40 controls charging of the main battery 38 with priority when the voltage of the main battery 38 is reduced.

Figure 4:
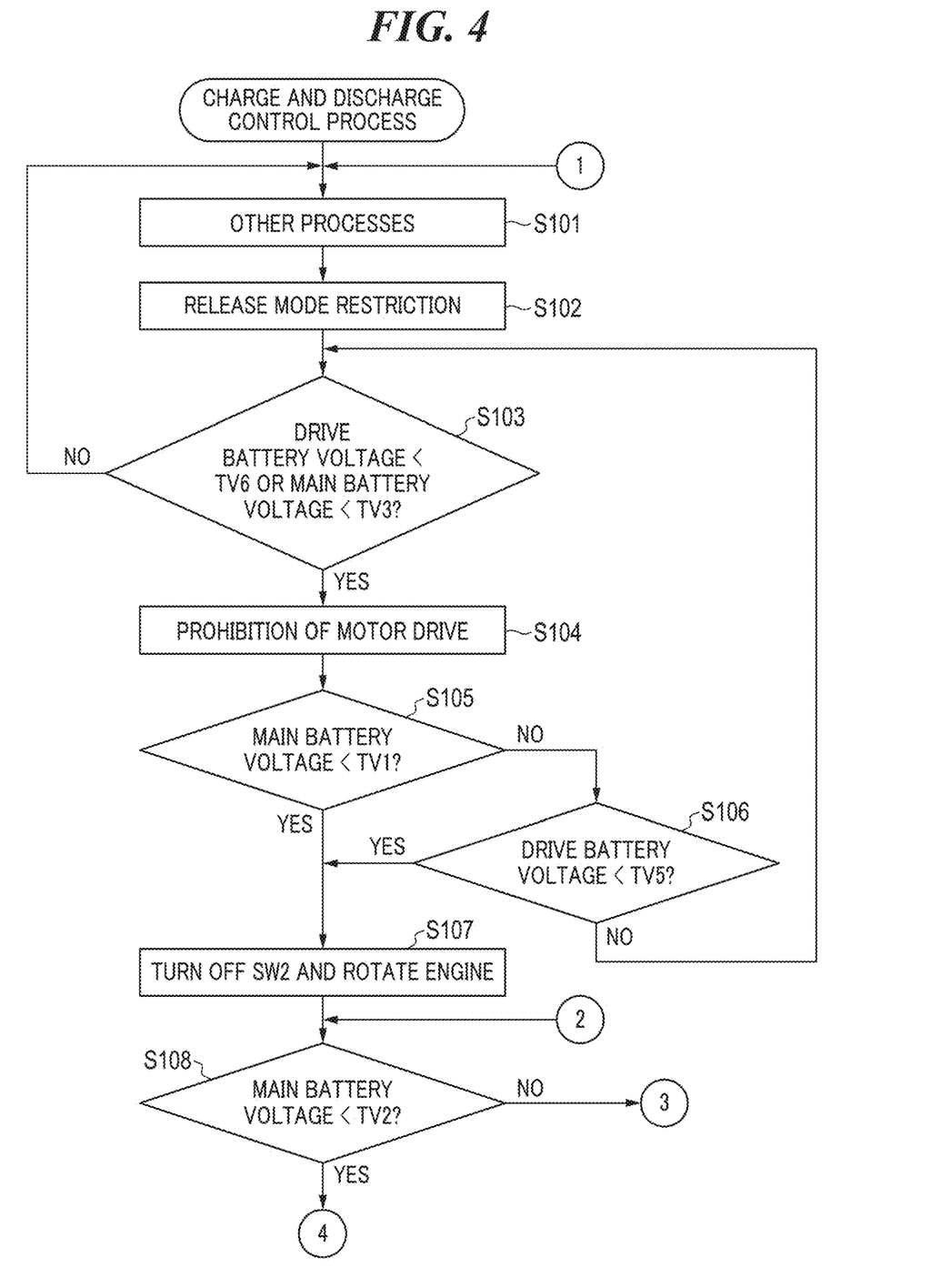
FIG. 4 is a flowchart showing a charge and discharge control process.
Figure 5:
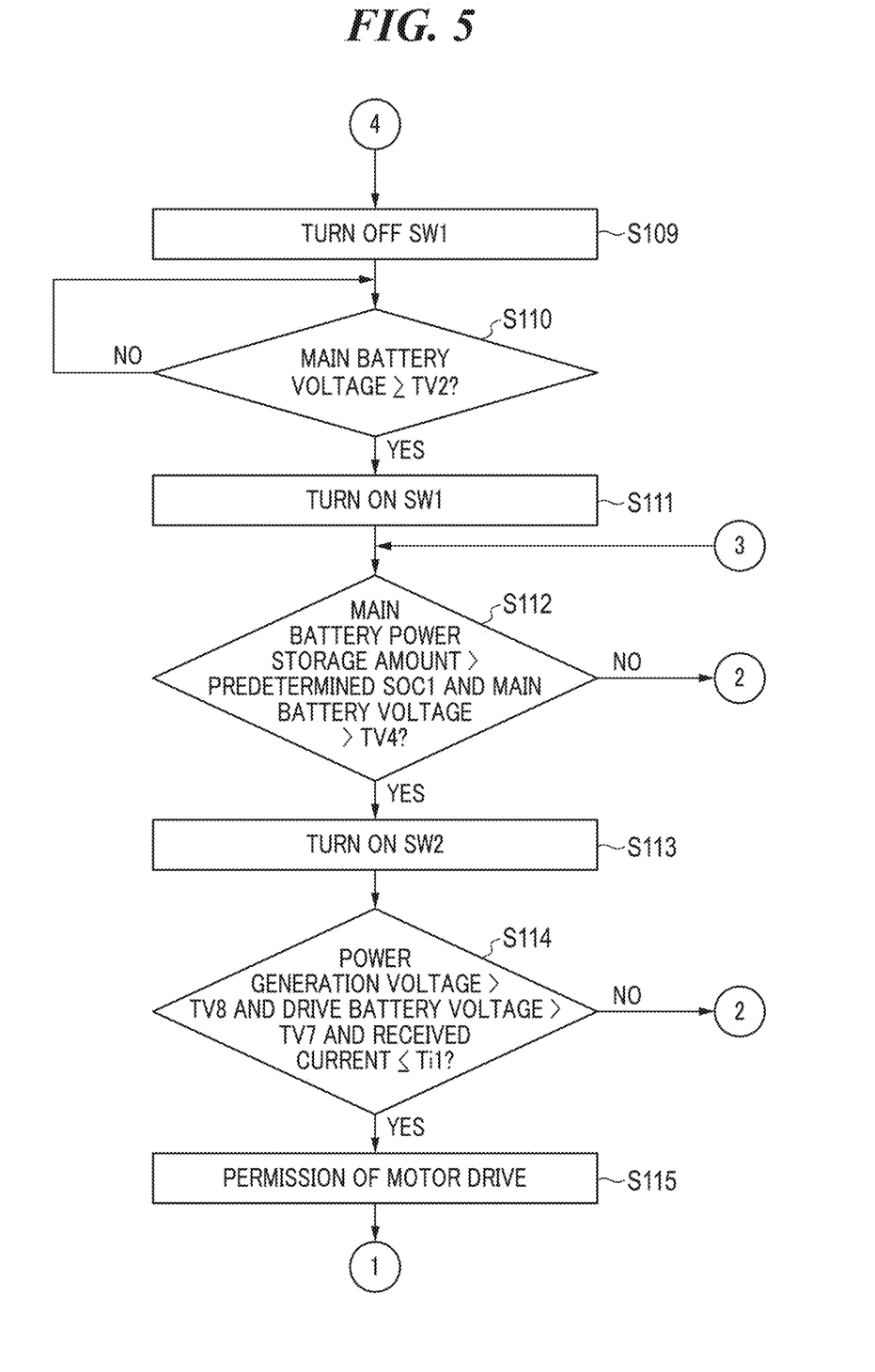
FIG. 5 is a subsequent flowchart of FIG. 4 showing the charge and discharge control process.

FIGS. 4 and 5 are flowcharts showing a charge and discharge control process. This process is achieved by the AHECU 40 running a control program stored beforehand in a storage unit (not shown) in a RAM (not shown) and executing the control program. This process is started when a main power source is turned on. First, the AHECU 40 always acquires the voltage mainV and the power storage amount mainSOC by monitoring detection results of the current sensors 61A and 61B. In addition, the AHECU 40 always acquires the voltage motV and the power storage amount motSOC of the drive battery 39 by monitoring a detection result of the current sensor 43. Further, the AHECU 40 always acquires power generation voltages generated by the generator 24 by monitoring detection results of the current sensors 42A and 42B. It is to be noted that a method to acquire the above voltages and SOCs does not matter. In FIGS. 4 and 5, an example of using the voltage mainV of the main battery 38 as the first value and using the voltage motV of the drive battery 39 as the second value will be described.

First, threshold values to be compared with the voltage motV of the drive battery 39, the voltage mainV of the main battery 38, or the power generation voltage generated by the generator 24 are listed as follows: a first threshold value TV1 (for example, about 11.5 V), a second threshold value TV2 (for example, about 11.2 V), a third threshold value TV3 (for example, about 12 V), a fourth threshold value TV4 (for example, about 12 V), a fifth threshold value TV5 (for example, about 11.5 V), a sixth threshold value TV6 (for example, about 12 V), a seventh threshold TV7 (for example, about 12 V), and an eighth threshold value TV8 (a predetermined voltage: about 14.5 V). The second threshold value TV2 is smaller than the first threshold value TV1. The third threshold value TV3 is greater than the first threshold value TV1. The sixth threshold value TV6 is greater than the fifth threshold value TV5. Specific values in the parentheses at the respective threshold values are merely examples, and the threshold values are not limited to these values.

In step S101, the AHECU 40 performs "other processes". In the "other processes" mentioned here, for example, various processes corresponding to settings and operations in a setting operation unit (not shown) are performed. The "other processes" also include a process of ending the process of the present flowchart based on an end instruction.

In step S102, the AHECU 40 releases a setting restriction in the operation mode of the outboard motor 12. That is, the operation mode is set as instructed. In step S103, the AHECU 40 determines at least one of whether the voltage motV of the drive battery 39 is smaller than the sixth threshold value TV6 (motV<TV6) and whether the voltage mainV of the main battery 38 is smaller than the third threshold value TV3 (mainV<TV3) is satisfied. When neither motV<TV6 nor mainV<TV3 is satisfied, the voltage of the drive battery 39 and the voltage of the main battery 38 are appropriate values. Thus, the AHECU 40 returns the process to step S101. When at least one of motV<TV6 and mainV<TV3 is satisfied, the AHECU 40 advances the process to step S104.

In step S104, the AHECU 40 prohibits a transition of the operation mode of the outboard motor 12 to the motor drive mode (the first motor drive mode or the second motor drive mode), regardless of an instructed operation mode. Accordingly, the power consumption on the line L2 caused by driving the motor 25 is avoided. In such a case, when the motor drive mode has been instructed, the AHECU 40 causes the operation mode of the outboard motor 12 to transition to the stop mode or the engine mode.

In step S105, the AHECU 40 determines whether the voltage mainV of the main battery 38 is smaller than the first threshold value TV1 (mainV<TV1). When mainV<TV1 is satisfied, that is, when the voltage of the main battery 38 becomes lower than an appropriate value, the AHECU 40 advances the process to step S107. In step S107, the AHECU 40 turns off the switch SW2, and also causes the engine 23 to rotate. Charging of the house battery 36 is prohibited by turning the switch SW2 to the disconnection state (OFF state). The AHECU 40 maintains the connection state (ON state) with respect to the switch SW1. When the process shifts from step S105 to step S107, the switch SW2 is turned off. Thus, the priority in charging the main battery 38 and the drive battery 39 is made higher than the house battery 36. In particular, as a result, the main battery 38 having a low voltage value is controlled to be charged mainly.

Since the switch SW2 is turned to the OFF state, the charging of the house battery 36 is prohibited, and the electric power on the line L4 supplied to the load 37 is also stopped. Accordingly, the power consumption on the line L2 is reduced. In order to charge the main battery 38, the AHECU 40 starts the rotation of the engine 23 when the engine 23 is stopped, and maintains the rotation when the engine 23 is rotating. For a prompt charge, when the engine 23 is rotating, the number of rotations may be increased. That is, the engine 23 may be rotated at a number of rotations greater than a target number of rotations that is designated.

In step S105, when mainV<TV1 is not satisfied, the AHECU 40 determines whether the voltage motV of the drive battery 39 is smaller than the fifth threshold value TV5 (motV<TV5), in step S106. When motV<TV5 is not satisfied, the AHECU 40 returns the process to step S103. When motV<TV5 is satisfied, that is, when the voltage of the drive battery 39 becomes lower than an appropriate value, the AHECU 40 performs step S107. When the process shifts from step S106 to step S107, the switch SW2 is turned off. Thus, as a result, control is conducted such that while charging the main battery 38 is provided, the drive battery 39 having a low voltage value is also charged.

Subsequent to step S107, the AHECU 40 determines whether the voltage mainV of the main battery 38 is smaller than the second threshold value TV2 (mainV<TV2), in step S108. When the mainV<TV2 is not satisfied, the AHECU 40 advances the process to step S112. On the other hand, when mainV<TV2 is satisfied, the AHECU 40 turns off the switch SW1 in step S109.

Charging of the drive battery 39 is prohibited by turning off the switch SW1. When the voltage mainV of the main battery 38 becomes smaller than the second threshold value TV2, which is smaller than the first threshold value TV1, the necessity of charging the main battery 38 becomes much higher. Thus, the AHECU 40 prohibits charging of the drive battery 39 and charges the main battery 38. Thus, providing electric power to start the engine is set to the highest priority.

Next, in step S110, the AHECU 40 waits until the voltage mainV of the main battery 38 becomes equal to or greater than the second threshold value TV2 (mainV TV2). When mainV TV2 is satisfied, the AHECU 40 turns the switch SW1 to the ON state in step S111. Accordingly, the prohibition of charging the drive battery 39 is released.

Next, in step S112, the AHECU 40 determines whether a condition that the power storage amount mainSOC of the main battery 38 is greater than a predetermined power storage amount SOC1 (mainSOC>SOC1) and the voltage mainV of the main battery 38 is greater than the fourth threshold value TV4 (mainV>TV4) is satisfied. This determination is made to determine whether the main battery 38 is deteriorated and the charging capability is lowered. When the above condition is not satisfied, the AHECU 40 returns the process to step S108. It is to be noted that even when a predetermined period of time elapses, when the shift from step S112 to step S108 is repeated, an error may be notified.

When the condition is satisfied in step S112, the main battery 38 is not deteriorated. Therefore, the AHECU 40 turns the switch SW2 to the ON state in step S113. Therefore, after charging of the house battery 36 is prohibited, when the above condition is satisfied, the prohibition of charging the house battery 36 is released.

In step S114, the AHECU 40 determines whether a condition that the power generation voltage generated by the generator 24 (the total of the power generation voltages generated by the generators 24A and 24B) is greater than the eighth threshold value TV8 (power generation voltage>TV8), the voltage motV of the drive battery 39 is greater than the seventh threshold value TV7 (motV>TV7), and an electric current amount received by the drive battery 39 becomes equal to or less than a predetermined electric current amount Ti1 (for example, about 5 A) (received electric current amount≤Ti1) is satisfied. The received electric current amount is acquired from a detection result of the current sensor 43.

When the condition is not satisfied in step S114, the AHECU 40 returns the process to step S108. When the condition is satisfied, it is determined that an electric power balance on the line L2 is improved enough to drive the motor 25. Then, the AHECU 40 releases the prohibition of the transition to the motor drive mode in step S115. That is, the AHECU 40 permits the transition to the motor drive mode. Therefore, when the instructed operation mode is the motor drive mode, the AHECU 40 causes the operation mode of the outboard motor 12 to transition to the motor drive mode. Subsequently, the AHECU 40 returns the process to step S101.

According to the present preferred embodiment, first, when the main battery 38 is a primary concern, the transition to the motor drive mode is prohibited (S104) when mainV<TV3 is satisfied. Further, when mainV<TV1 is satisfied, the switch SW2 is turned off. Thus, charging of the house battery 36 is prohibited, and in addition, the engine 23 is rotated (S107). Accordingly, the power storage amount of the main battery 38, that is, the electric power to start the engine has priority.

In addition, when the drive battery 39 is a primary concern, the transition to the motor drive mode is prohibited (S104) when motV<TV6 is satisfied. Furthermore, when motV<TV5 is satisfied, the switch SW2 is turned off. Thus, charging of the house battery 36 is prohibited, and in addition, the engine 23 is rotated (S107). Accordingly, while charging of the main battery 38 is provided, the drive battery 39, the voltage value of which is lowered, is easily charged.

It is to be noted that the prohibition of the transition to the motor drive mode may be performed at a timing when mainV<TV1 or motV<TV5 is satisfied. In addition, when mainV<TV1 or motV<TV5 is satisfied, it is not essential that both the prohibition of the transition to the motor drive mode and turning off the switch SW2 are performed. At least one of the prohibition and the turning off may be performed.

In step S107, when the control is conducted such that the engine 23 is caused to rotate to charge the main battery 38, charging is promptly performed by causing the engine 23 to rotate at a number of rotations greater than the target number of rotations that is designated.

Further, when mainV<TV2 is satisfied, the switch SW1 is turned off, and thus charging of the drive battery 39 is prohibited (S109). Accordingly, when a charged voltage of the main battery 38 becomes much lower, providing electric power to start the engine is set to the highest priority.

After charging of the drive battery 39 is prohibited when mainV≥TV2 is satisfied, the switch SW1 is turned on and charging of the drive battery 39 is restarted (S111). Accordingly, charging of the drive battery 39 is restarted while a certain degree of the electric power to start the engine is provided.

In addition, after charging of the house battery 36 is prohibited when mainSOC>SOC1 is satisfied and mainV>TV4 is satisfied, the prohibition of charging the house battery 36 is released (S113). Accordingly, continuous use of the main battery 38, which has been deteriorated, is avoided.

After the transition to the motor drive mode is prohibited when (the power generation voltage)>TV8, motV>TV7, and (the received electric current amount)≤Ti1 are satisfied, the prohibition of the transition to the motor drive mode is released (S115). Accordingly, driving of the motor 25 is restarted after the electric power balance on the line L2 is improved.

Heretofore, while the present invention has been described in detail with reference to preferred embodiments thereof, the present invention is not limited to these specific preferred embodiments, but also includes various preferred embodiments and modifications thereof without departing from the scope and spirit of the present invention.

It is to be noted that a voltage sensor may be provided instead of the current sensor, so that a value of the voltage mainV and/or the voltage motV may be acquired from the voltage sensor.

In the charge and discharge control process (FIGS. 4 and 5), the determination in each step is made mainly in accordance with the voltage of the main battery 38 or the drive battery 39. However, the power storage amount may be used for the determinations instead of the voltage. That is, as the first value, the power storage amount mainSOC may be used instead of the voltage mainV of the main battery 38. As the second value, the power storage amount motSOC may be used instead of the voltage motV of the drive battery 39. In such cases, first to eighth threshold power storage amounts are provided instead of the first to eighth threshold values TV1 to TV8. In some steps, a voltage value may be used as the first and second values, and in the other steps, a power storage amount may be used.

Each of a plurality of batteries to be controlled in preferred embodiments of the present invention has been described as a lead battery. However, a battery to be controlled is not limited to the lead battery, and may be, for example, a lithium ion battery.

The generator 24 is mounted on the engine 23 in general, but the generator 24 may be mounted on the hull 11.

The number of the outboard motors 12 provided on the marine vessel 10 may be one, or three or more. The trim tab 13 may not necessarily be provided.

Marine vessels to which preferred embodiments of the present invention are applied is not limited to a marine vessel including an outboard motor, and may be a marine vessel including another type of marine propulsion device, such as an inboard/outboard motor (stern drive, inboard motor/outboard drive), an inboard motor, a water jet drive, and the like.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A control device for a battery of a marine vessel, the control device being configured or programmed to control a plurality of batteries mounted on the marine vessel in which a propeller of a marine propulsion device of the marine vessel is driven by any of an engine and a motor, the plurality of batteries include a main battery to supply electric power to start the engine, a drive battery to supply the electric power to drive the motor, and a load battery to supply the electric power to a load on the marine vessel, and the plurality of batteries are chargeable by a generator, the control device comprising:
   a controller configured or programmed to:
      acquire a first value indicating either a voltage or a power storage amount of the main battery; and
      when the first value that has been acquired is smaller than a first threshold value, perform at least one of a prohibition of a transition to a motor drive mode in which the propeller is driven by using at least the motor regardless of an operation mode that is designated and a prohibition of charging the load battery, and cause the engine to rotate to charge the main battery.

2. The control device according to claim 1, wherein the controller is configured or programmed to prohibit the charging of the drive battery when the first value is smaller than a second threshold value that is smaller than the first threshold value.

3. The control device according to claim 2, wherein the controller is configured or programmed to, after prohibiting the charging of the drive battery, restart the charging of the drive battery when the first value becomes equal to or greater than the second threshold value.

4. The control device according to claim 2, wherein the controller is configured or programmed to prohibit the charging of the drive battery by turning off a switch provided on a line that connects the generator and the drive battery.

5. The control device according to claim 1, wherein the controller is configured or programmed to:
   prohibit the transition to the motor drive mode regardless of the operation mode that is designated when the first value becomes smaller than a third threshold value that is greater than the first threshold value; and
   prohibit the charging of the load battery when the first value becomes smaller than the first threshold value.

6. The control device according to claim 1, wherein the controller is configured or programmed to, after prohibiting the charging of the load battery, release the prohibition of the charging of the load battery on a condition that the power storage amount of the main battery is greater than a predetermined power storage amount and the voltage of the main battery is greater than a fourth threshold value.

7. The control device according to claim 1, wherein the controller is configured or programmed to:
   acquire a second value indicating either a voltage or a power storage amount of the drive battery; and
   when the second value that has been acquired is smaller than a fifth threshold value, perform at least one of the prohibition of the transition to the motor drive mode regardless of the operation mode that is designated and the prohibition of the charging of the load battery, and cause the engine to rotate to charge the main battery.

8. The control device according to claim 7, wherein the controller is configured or programmed to:
   prohibit the transition to the motor drive mode regardless of the operation mode that is designated when the second value becomes smaller than a sixth threshold value that is greater than the fifth threshold value; and
   prohibit the charging of the load battery when the second value becomes smaller than the fifth threshold value.

9. The control device according to claim 7, wherein the controller is configured or programmed to, after prohibiting the transition to the motor drive mode, release the prohibition of the transition to the motor drive mode on a condition that a power generation voltage generated by the generator is greater than a predetermined voltage, the second value is greater than a seventh threshold value, and an electric current amount received by the drive battery becomes equal to or less than a predetermined electric current amount.

10. The control device according to claim 1, wherein, when causing the engine to rotate to charge the main battery, the controller is configured or programmed to cause the engine to rotate at a number of rotations greater than a target number of rotations that is designated.

11. A control method for a battery of a marine vessel, the control method controlling a plurality of batteries mounted on the marine vessel in which a propeller of a marine propulsion device of the marine vessel is driven by any of an engine and a motor, the plurality of batteries include a main battery to supply electric power to start the engine, a drive battery to supply the electric power to drive the motor, and a load battery to supply the electric power to a load on the marine vessel, and the plurality of batteries are chargeable by a generator, the control method comprising:
   when a first value indicating either a voltage or a power storage amount of the main battery is smaller than a first threshold value, performing at least one of a prohibition of a transition to a motor drive mode in which the propeller is driven by using at least the motor regardless of an operation mode that is designated and a prohibition of charging the load battery; and
   causing the engine to rotate to charge the main battery.

12. The control method according to claim 11, further comprising:
   prohibiting the charging of the drive battery when the first value is smaller than a second threshold value that is smaller than the first threshold value.

13. The control method according to claim 11, further comprising:
   prohibiting the transition to the motor drive mode regardless of the operation mode that is designated when the first value becomes smaller than a third threshold value that is greater than the first threshold value; and prohibiting the charging of the load battery when the first value becomes smaller than the first threshold value.

14. The control method according to claim 11, further comprising:

after the charging of the load battery is prohibited, releasing the prohibition of the charging of the load battery on a condition that the power storage amount of the main battery is greater than a predetermined power storage amount and the voltage of the main battery is greater than a fourth threshold value.

15. The control method according to claim 11, further comprising:

performing at least one of the prohibition of the transition to the motor drive mode regardless of the operation mode that is designated and the prohibition of the charging of the load battery when a second value indicating either a voltage or a power storage amount of the drive battery is smaller than a fifth threshold value; and causing the engine to rotate to charge the main battery.

16. The control method according to claim 11, wherein, when causing the engine to rotate to charge the main battery, the engine is caused to rotate at a number of rotations greater than a target number of rotations that is designated.

17. A marine vessel comprising:

a control device;

a marine propulsion device including a propeller that is driven by any of an engine and a motor; and a plurality of batteries including a main battery to supply electric power to start the engine, a drive battery to supply the electric power to drive the motor, and a load battery to supply the electric power to a load on the marine vessel, the plurality of batteries being chargeable by a generator; wherein the control device includes a controller configured or programmed to:

acquire a first value indicating either a voltage or a power storage amount of the main battery; and when the first value that has been acquired is smaller than a first threshold value, perform at least one of a prohibition of a transition to a motor drive mode in which the propeller is driven by using at least the motor regardless of an operation mode that is designated and a prohibition of charging the load battery, and cause the engine to rotate to charge the main battery.

* * * * *